US012493007B2

(12) United States Patent
Neill et al.

(10) Patent No.: US 12,493,007 B2
(45) Date of Patent: Dec. 9, 2025

(54) METHODS AND APPARATUS FOR LOW-VOLATILITY SAMPLING (71) Applicant: BrightSpec, Inc., Charlottesville, VA (US)

(72) Inventors: Justin L. Neill, Charlottesville, VA (US); Matt Muckle, Earlysville, VA (US); Roger Reynolds, Charlottesville, VA (US)

(73) Assignee: BrightSpec, Inc., Charlottesville, VA (US)

( * ) Notice: Subject to any disclaimer, the term of this patent is extended or adjusted under 35 U.S.C. 154(b) by 906 days.

(21) Appl. No.: 17/266,260

(22) PCT Filed: Aug. 8, 2019

(86) PCT No.: PCT/US2019/045661
§ 371 (c)(1),
(2) Date: Feb. 5, 2021

(87) PCT Pub. No.: WO2020/068280
PCT Pub. Date: Apr. 2, 2020

(65) Prior Publication Data
US 2021/0302340 A1    Sep. 30, 2021

Related U.S. Application Data (60) Provisional application No. 62/715,846, filed on Aug. 8, 2018.

(51) Int. Cl.
*G01N 22/00*    (2006.01)
*G01N 24/00*    (2006.01)
(Continued)

(52) U.S. Cl.
CPC ......... *G01N 24/087* (2013.01); *G01N 24/008* (2013.01); *A61B 5/055* (2013.01);
(Continued)

(58) Field of Classification Search
None
See application file for complete search history.

(56) References Cited

U.S. PATENT DOCUMENTS 4,607,521 A * 8/1986 Saito ...................... G01N 22/00
                                                    324/642
5,124,653 A    6/1992 Andresen et al.
(Continued)

FOREIGN PATENT DOCUMENTS

CN    101140993 A    3/2008
CN    101512384 A    8/2009
(Continued)

OTHER PUBLICATIONS

A Technical Guide for Static Headspace Analysis Using GC. Restek Lit. Cat.# 59895B. 2000. Accessed at https://www.restek.com/pdfs/59895B.pdf. 20 pages.
(Continued)

*Primary Examiner* — Paul S Hyun
(74) *Attorney, Agent, or Firm* — Smith Baluch LLP (57) ABSTRACT Molecular rotational resonance (MRR) spectroscopy is a structurally-specific, high-resolution spectroscopy technique that can provide accurate reaction process data with finer time resolution than existing techniques. It is the only analytical technique that can make online chiral composition measurements. This makes it especially useful for online reaction monitoring, which is done today by manually pulling off samples and measuring samples offline and takes 3-4 hours per measurement. Conversely, an MRR spectrometer can resolve isomers in about 10 minutes when fed with a low-volatility sampling interface that connects directly to the reaction line. The sampling interface measures a precise sample of the reaction solution, boils off the solvent to concentrate the analyte, volatilizes the analyte, and injects the volatilized analyte into the MRR spectrometer's mea-
(Continued)

surement chamber for an MRR measurement. The sample concentration and volatilization happen quickly and without any extra sample preparation.

15 Claims, 9 Drawing Sheets

(51) Int. Cl.
    *G01N 24/08*     (2006.01)
    *A61B 5/055*     (2006.01)
    *G01R 33/46*     (2006.01)
    *G01R 33/485*     (2006.01)

(52) U.S. Cl.
    CPC ............ *G01N 24/085* (2013.01); *G01R 33/46* (2013.01); *G01R 33/485* (2013.01)

(56) References Cited

U.S. PATENT DOCUMENTS

| | | | | |
|---|---|---|---|---|
| 5,792,423 | A | * | 8/1998 | Markelov ............... G01N 30/24 422/83 |
| 2007/0020701 | A1 | | 1/2007 | Menon et al. |
| 2010/0066374 | A1 | | 3/2010 | Trygstad et al. |
| 2011/0032621 | A1 | | 2/2011 | Marchand et al. |
| 2015/0177164 | A1 | * | 6/2015 | Patterson ............... G01N 22/00 324/639 |
| 2015/0260695 | A1 | | 9/2015 | Spartz et al. |
| 2016/0131600 | A1 | * | 5/2016 | Pate ....................... G01N 22/00 250/339.08 |
| 2017/0356865 | A1 | | 12/2017 | Takis et al. |
| 2018/0321164 | A1 | * | 11/2018 | Cameron ............... G01N 22/00 |
| 2019/0302015 | A1 | * | 10/2019 | Pate ....................... G01N 22/00 |

FOREIGN PATENT DOCUMENTS

| | | | |
|---|---|---|---|
| CN | 102292374 | A | 12/2011 |
| CN | 104364635 | A | 2/2015 |
| CN | 105308173 | A | 2/2016 |
| CN | 106602586 | A | 4/2017 |
| CN | 107850650 | A | 3/2018 |
| WO | 1993003493 | A1 | 2/1993 |
| WO | 1994020150 | A1 | 9/1994 |
| WO | 2008079829 | A2 | 7/2008 |
| WO | 2017077083 | A1 | 5/2017 |
| WO | 2018081243 | A1 | 5/2018 |

OTHER PUBLICATIONS

Al-Othman et al., "Enantio-separation of drugs with multiple chiral centers by chromatography and capillary electrophoresis." Biomedical Chromatography 28.11 (2014): 1514-1524.
Balle et al., "A new method for observing the rotational spectra of weak molecular complexes: KrHCl." The Journal of Chemical Physics 72.2 (1980): 922-932.
Bell, A Novel Approach in HPLC Chiral Method Development: Dealing with Multiple Chiral Centers. Sigma-Aldrich 2013. Accessed at https://www.sigmaaldrich.com/content/dam/sigma-aldrich/countries/european-images/events/hplc2013/HPLC2013-poster-hplc-chiral-method-development.pdf.
Brown et al., "A broadband Fourier transform microwave spectrometer based on chirped pulse excitation." Review of Scientific Instruments 79.5 (2008): 053103. 14 pages.
Browne et al., "Continuous flow reaction monitoring using an on-line miniature mass spectrometer." Rapid Communications in Mass Spectrometry 26.17 (2012): 1999-2010.
Carter et al., "ReactIR flow cell: a new analytical tool for continuous flow chemical processing." Organic Process Research & Development 14.2 (2010): 393-404.
Clay et al., A Programmed Temperature Vaporizing Injector for Large Volume Injections. Thermo Electron Corporation ISO 9001, Application Note: 10094. 2004. Accessed at https://static.thermoscientific.com/images/D14316~.pdf. 2 pages.
Feth et al., "Pilot plant PAT approach for the diastereoselective diimide reduction of artemisinic acid." Organic Process Research & Development17.2 (2013): 282-293.
Foley et al., "Online NMR and HPLC as a reaction monitoring platform for pharmaceutical process development." Analytical Chemistry 85.19 (2013): 8928-8932.
Foley et al., "ReactNMR and ReactIR as reaction monitoring and mechanistic elucidation tools: the NCS mediated cascade reaction of α-thioamides to α-thio-β-chloroacrylamides." The Journal of Organic Chemistry 76.23 (2011): 9630-9640.
GC Inlets An Introduction, Manual Part No. 5958-9468. Agilent Technologies 2005. Accessed at https://www.agilent.com/cs/library/usermanuals/public/5958-9468_041007.pdf. 182 pages.
Guidance for Industry, PAT—A Framework for Innovative Pharmaceutical Development, Manufacturing, and Quality Assurance; U.S. Department of Health and Human Services, Food and Drug Administration: Rockville, MD, Sep. 2004. Accessed at https://www.fda.gov/downloads/drugs/guidances/ucm070305.pdf. 19 pages.
Guo et al., "Determination of enantiomeric excess in samples of chiral molecules using Fourier transform vibrational circular dichroism spectroscopy: simulation of real-time reaction monitoring." Analytical Chemistry 76.23 (2004): 6956-6966.
Harris et al., "Fourier-Transform Molecular Rotational Resonance Spectroscopy: Bridging the Gap Between Spectroscopy and Chromatography for VOC Analysis." Chromatography Online 33.10 (2015): 18-24.
International Search Report and Written Opinion in International Patent Application No. PCT/US2019/045661 mailed Mar. 5, 2020, 12 pages.
Kung et al., "Approaches and recent developments for the commercial production of semi-synthetic artemisinin." Frontiers in Plant Science 9 (2018): 87. 7 pages.
Li et al., "Monitoring the progress of a photochemical reaction performed in supercritical fluid carbon dioxide using a continuously stirred reaction cell interfaced to on-line SFC." Chromatographia 80.8 (2017): 1179-1188.
Lovas et al., "Evolution of microwave spectroscopy at the National Bureau of Standards (NBS) and the National Institute of Standards and Technology (NIST)." Journal of Research of the National Institute of Standards and Technology 117 (2012): 268-296.
Maiwald et al., "Quantitative high-resolution online NMR spectroscopy in pharmaceutical reaction and process monitoring." Chapter 8—NMR Spectroscopy in Pharmaceutical Analysis. Elsevier, 2008. 471-491.
Malig et al., "Real-time HPLC-MS reaction progress monitoring using an automated analytical platform." Reaction Chemistry & Engineering 2.3 (2017). Abstract only. 5 pages.
Mikhonin et al., "Identification and Quantitation of Hard-to-Resolve Individual Components in Mixtures without Chromatography, Chemometrics, and Reference Standards." (2018). Accessed at http://brightspec.com/wp-content/uploads/BrightSpec_ChiralAnalysis_WhitePaper_FINAL.pdf on Jun. 28, 2018. 7 pages.
Moore et al., ""Batch" kinetics in flow: online IR analysis and continuous control." Angewandte Chemie 126.2 (2014): 480-483.
Neill et al., "Chiral Process Monitoring Using Fourier Transform Microwave Spectroscopy." 72nd International Symposium on Molecular Spectroscopy. 2017. Accessed at https://www.ideals.illinois.edu/handle/2142/96847. 13 pages.
Neill et al., "Fast Chiral Monitoring in a Continuous Pharmaceutical Synthesis by Molecular Rotational Resonance Spectroscopy." 73rd International Symposium on Molecular Spectroscopy. 2018. Accessed at https://www.ideals.illinois.edu/handle/2142/100817. 14 pages.
Neill et al., "Online Stereochemical Process Monitoring by Molecular Rotational Resonance Spectroscopy." Organic Process Research & Development 23.5 (2019): 1046-1051.
Nie et al., "recent application of chiral liquid chromatography-tandem mass spectrometric methods for enantiomeric pharmaceutical and biomedical determinations." Journal of Chromatographic Science 51.8 (2013): 753-763.

(56) References Cited

OTHER PUBLICATIONS

Pate et al., "Quantitative chiral analysis by molecular rotational spectroscopy." Chapter 17, Chiral Analysis. Elsevier, 2018. 679-729.

Patterson et al., "Enantiomer-specific detection of chiral molecules via microwave spectroscopy." Nature 497.7450 (2013): 475-477.

Peplow, Looking for cheaper routes to malaria medicines. C&E News vol. 96 Issue 1 29-31 (2018). Accessed at https://cen.acs.org/articles/96/111/Looking-cheaper-routes-malaria-medicines.html. 10 pages.

Porterfield et al., "High sensitivity microwave spectroscopy in a cryogenic buffer gas cell." Review of Scientific Instruments 90.5 (2019): 053104. 8 pages.

Schafer et al., "Mobile tool for HPLC reaction monitoring." Organic Process Research & Development 11.5 (2007): 870-876.

Shubert et al., "Chiral analysis using broadband rotational spectroscopy." The Journal of Physical Chemistry Letters 7.2 (2016): 341-350.

Shubert et al., "Identifying enantiomers in mixtures of chiral molecules with broadband microwave spectroscopy." Angewandte Chemie International Edition 53.4 (2014): 1152-1155.

Suenram et al., "Reinvestigation of the microwave spectrum of acetamide." Journal of Molecular Spectroscopy 208.2 (2001): 188-193.

Tipler, "An Introduction to Headspace Sampling in Gas Chromatography," PerkinElmer, 2013, 35 pages.

Twagirayezu et al., "Spectroscopic Characterization of Small Polar Impurities in Gasoline." 73rd International Symposium on Molecular Spectroscopy. 2018. Accessed at https://www.ideals.illinois.edu/handle/2142/100610.18 pages.

Welch et al., "Online analysis of flowing streams using microflow HPLC." Organic Process Research & Development 13.5 (2009): 1022-1025.

Zawatzky et al., "Facile kinetic profiling of chemical reactions using MISER chromatographic analysis." Tetrahedron 73.33 (2017): 5048-5053.

Zientek et al., "Simultaneous 19F-1H medium resolution NMR spectroscopy for online reaction monitoring." Journal of Magnetic Resonance 249 (2014): 53-62.

Office Action in European Application No. 19867059.8 dated Sep. 20, 2023, 4 pages.

Chinese Office Action with translation in Chinese App. No. 201980065958.X dated Dec. 29, 2023, 16 pages.

Perez Pavon, et al. "Headspace-programmed temperature vaporizer-fast gas chromatography-mass spectrometry coupling for the determination of trihalomethanes in water." Journal of Chromatography A 1194.1 (2008): 103-110.

Engewald et al. "Programmed temperature vaporisers-based large volume injection in capillary gas chromatography." Journal of Chromatography A 842.1-2 (1999): 143-161.

Extended European Search Report in European Application No. 19867059.8 dated Jul. 4, 2022, 10 pages.

Harris et al. "Fourier transform molecular rotational resonance spectroscopy for reprogrammable chemical sensing." Terahertz, RF, Millimeter, and Submillimeter-Wave Technology and Applications VIII. vol. 9362. SPIE, 2015, 10 pages.

Pavon et al. "Headspace-programmed temperature vaporizer-fast gas chromatography-mass spectrometry coupling for the determination of trihalomethanes in water." Journal of Chromatography A 1194.1 (2008): 103-110.

Office Action in European App. No. 19867059.8 dated May 29, 2024, 4 pages.

Office Action with translation in Chinese App. No. 201980065958.X dated May 23, 2024, 8 pages.

\* cited by examiner

Photograph of LVS inlet integrated with MRR spectrometer.

METHODS AND APPARATUS FOR LOW-VOLATILITY SAMPLING

CROSS-REFERENCE TO RELATED APPLICATION(S)

This application is a national-stage application, under 35 U.S.C. § 371, of International Application No. PCT/US2019/045661, filed on Aug. 8, 2019, and entitled "Methods and Apparatus for Low-Volatility Sampling." which claims the priority benefit, under 35 U.S.C. § 119(e), of U.S. Application No. 62/715,846, filed on Aug. 8, 2018, and entitled "Methods and Apparatus for Low-Volatility Sampling," each of which is incorporated herein by reference in its entirety.

GOVERNMENT SUPPORT

This invention was made with Government support under Grant No. W31P4Q-15-C-0019 awarded by the U.S. Army. The Government has certain rights in the invention.

BACKGROUND

Molecular rotational resonance (MRR) spectroscopy identifies molecules based on their fingerprint spectra in the microwave-to-millimeter wave region of the spectrum (1-40 GHz for the microwave region and 30-3000 GHz for the millimeter region). The distinctive spectra for each compound arise from radiation interacting with the end-over-end rotation of each molecule in a low-pressure (e.g., less than 100 mTorr) gas-phase environment. The pattern of the spectrum correlates very precisely with the three-dimensional structure of the molecule, so any modification to the structure of the molecule changes this pattern and allows for differentiation of molecules based on their structures. The extremely high resolution of the technique means that the patterns (spectra) of different compounds can be resolved directly in a mixture without separation. Additionally, the structure of the pattern depends only on the three-dimensional structure (mass distribution and electronic charge distribution) of the molecule, which can be calculated accurately and efficiently by commercially available quantum chemistry software. Therefore, compounds can be identified directly in a complex mixture without the need for pure reference standards, which can be very expensive and difficult to produce.

Some MRR spectrometers are investigative, high-flexibility instruments for measuring broadband spectra—that is, they can characterize all the analytes in a sample, including those that are unknown or unanticipated. While this is highly desirable in an analytical lab setting, where the most comprehensive possible analysis of a sample is desired, at the process line the analytes of interest are known and simpler analyses are desired. In addition, these investigative instruments use high-bandwidth digital components, so they are expensive.

Other MRR spectrometers are designed to measure targeted spectra-focusing only on the known resonances of specific analytes in each sample. This reduces the cost of the waveform generation and detection dramatically, while preserving the molecular specificity of the technique. Targeted analyses are also more sensitive (by a factor of 10-to-100) than broadband analyses in the same amount of time, due to the focusing of excitation power over specific frequency ranges.

SUMMARY

The inventors have recognized that MRR spectroscopy is particularly suitable for rapidly identifying and quantitating isomers-including enantiomers, diastereomers, and regioisomers—in a reaction mixture. Fourier-transform infrared (FTIR), Raman, and ultraviolet-visible (UV-Vis) spectroscopy have coarser spectral resolution than MRR spectroscopy: it is generally not possible to resolve spectra of low-level impurities using these techniques. Gas and liquid chromatography can identify multi-component mixtures with better accuracy than optical spectroscopy but are slow and labor intensive. Additionally, with gas and liquid chromatography, structurally similar chemicals and isomers are subject to co-elution, which limits structural specificity. Nuclear magnetic resonance (NMR) systems need a chiral shift reagent to resolve enantiomers. And mass spectrometry cannot resolve isomers without substantial effort.

Reaction monitoring by MRR spectroscopy has built-in advantages over other measurement techniques due to MRR spectroscopy's sensitivity to stereoisomers and regioisomers within mixtures. Nevertheless, there are challenges to using MRR spectroscopy for reaction monitoring, including the challenge of volatilizing analytes with high molecular weights. To address this challenge, the inventors have developed low-volatility sampling methods and interfaces that can volatilize high-molecular-weight analytes (e.g., analytes whose molecular weights are greater than 100 daltons) with low volatility (e.g., a boiling point greater than 100° C.) fast enough for online reaction monitoring.

These low-volatility sampling methods and interfaces include a method of analyzing a mixture of analytes in a solution. An example of this method includes extracting a sample, including the mixture of analytes and a solvent, of the solution. The sample is transferred into a reservoir, which is heated to a first temperature to evaporate the solvent from the solution. Then the reservoir is heated to a second temperature higher than the first temperature to volatilize at least one analyte in the mixture of analytes. This analyte is transferred from the reservoir to a nozzle that is thermally isolated from the reservoir. The nozzle injects the volatilized analyte into a vacuum chamber, where a molecular rotational resonance (MRR) spectrum of the analyte is measured. The analyte is identified based on the MRR spectrum.

Other embodiments include a sampling interface for an MRR spectrometer. This sampling interface includes a pump, a reservoir in fluid communication with the pump, a heater in thermal communication with the reservoir, and a nozzle that is thermally isolated from and in fluid communication with the reservoir. In operation, the pump measures a sample of a solution containing a mixture of analytes and a solvent. The reservoir receives the sample. The heater heats the sample to a first temperature high enough to evaporate the solvent and to a second temperature high enough to volatilize at least one analyte in the mixture of analytes. And the nozzle vents the analyte into a vacuum chamber of the MRR spectrometer.

Another embodiment includes a method of analyzing a mixture of analytes in a solution. An example of this method comprises regulating a flow of the solution into a reservoir. The mixture of analytes is continuously volatilized and transferred from the reservoir to a vacuum chamber, where the MRR spectrum of the analyte is measured. The MRR spectrum is used to identify at least one component of the mixture of analytes in the sample.

Yet another embodiment includes another sampling interface for an MRR spectrometer. This sampling interface includes a flow regulator, a reservoir in fluid communication with the pump, a heater in thermal communication with the reservoir, and a nozzle in fluid communication with the reservoir. In operation, the flow regulator regulates a flow of a solution containing a mixture of analytes and a solvent. The reservoir receives the sample. The heater heats the reservoir to a temperature high enough to volatilize the mixture of analytes. And the nozzle vents the mixture of analytes into a vacuum chamber of the MRR spectrometer.

All combinations of the foregoing concepts and additional concepts discussed in greater detail below (provided such concepts are not mutually inconsistent) are part of the inventive subject matter disclosed herein. All combinations of claimed subject matter appearing at the end of this disclosure are part of the inventive subject matter disclosed herein. The terminology used herein that also may appear in any disclosure incorporated by reference should be accorded a meaning most consistent with the concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Molecular rotational resonance (MRR) spectroscopy can be used to monitor reactions for completion, product yield, intermediates, and impurities including isomers (enantiomers, diastereomers, and/or regioisomers). Its impact arises from the new chemical insights (e.g., resolution and specificity), measurements yields, and the speed with which it can generate results. The new chemical insights mean a greater ability to understand why a chemical process worked or did not work as intended, and the speed can advance the larger objective of continuous manufacturing within the pharmaceutical industry.

Unlike other techniques for analytical chemistry, MRR spectroscopy can be used to quickly identify and quantify individual components in complex mixtures, including isomeric impurities that are often very difficult or impossible to resolve by other techniques. MRR spectroscopy's advantages make it especially suitable for analyzing volatile chemicals in a pharmaceutical research and development lab. Because MRR spectroscopy works by analyzing molecules in the low-pressure gas phase, the volatile chemicals are volatilized, or changed from solutions or solids into the gas phase for measurement.

Volatilizing chemicals can be challenging, especially when trying to ensure that the MRR spectrometer analyzes a volatilized chemical (or chemical mixture) related to what was in the original sample. Fortunately, the inventive low-volatility sampling interfaces can reliably and reproducibly introduce both gas and condensed-phase samples into rotational spectroscopy instruments. A low-volatility sampling interface concentrates and volatilizes an analyte, such as an active pharmaceutical ingredient (API), API precursor, API intermediate, or API reaction byproduct, in a liquid solution for measurement using MRR spectroscopy. The low-volatility sampling interface volatilizes analytes into a carrier gas stream over a period of seconds to minutes—the interface heats the sample below its boiling point, and the resulting vapor is entrained into the carrier gas. The interface has a nozzle that automatically injects the vapor into a vacuum chamber for MRR analysis. The heating boils off the solvent (e.g., EtOH) before analysis, so the MRR signals in dilute solution are essentially equal to those observed from pure solids. This works especially well when the analytes in the sample are expected to have similar vapor pressures because it reduces headspace partitioning.

Unlike other sampling interfaces, the low-volatility sampling interface can volatilize molecules whose molecular weights are above 100 atomic mass units or daltons (u or Da) directly from a solution.with molecular weights are over 100 Da without removing the solvent or other (small) impurities in advance. This ability makes inventive low-volatility sampling interfaces suitable for sampling analytes directly from an automated process line. Sampling larger analytes directly from an automated process line is a huge advantage over current sampling techniques, which involve manually placing a pure solid or liquid sample in a reservoir for volatilization.

The ability to volatilize larger molecules directly from reaction solutions makes it possible to use MRR spectroscopy for monitoring the process research and development phase of API synthesis. This is the stage where a small number of candidate drugs are synthesized in order to produce the material for toxicological, stability, and formulation studies, and ultimately for clinical trials for the promising candidates. This is also the stage at which synthetic routes are developed and optimized for yield, efficiency, and cost. The rate at which poor candidates can be eliminated and good ones advanced is a critical determinant of the cost and productivity of a drug program. For MRR spectroscopy, rapid, simple method development and fast analysis time are compelling advantages over other analytical techniques. Additionally, the capability to easily resolve isomeric impurities (regioisomers, diastereomers, and enantiomers) in a mixture is a significant challenge that is currently unmet in this field.

Metered Low-Volatility Sampling Interface for MRR Spectroscopy

Figure 1A:
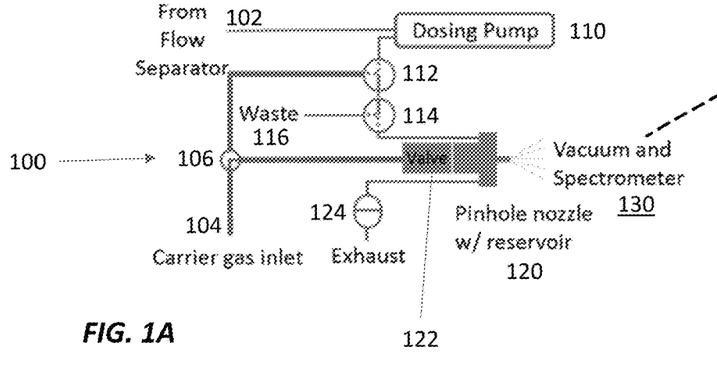
FIG. 1A is a schematic diagram of a low-volatility sampling inlet for reaction mixtures by MRR spectroscopy.
Figure 1B:
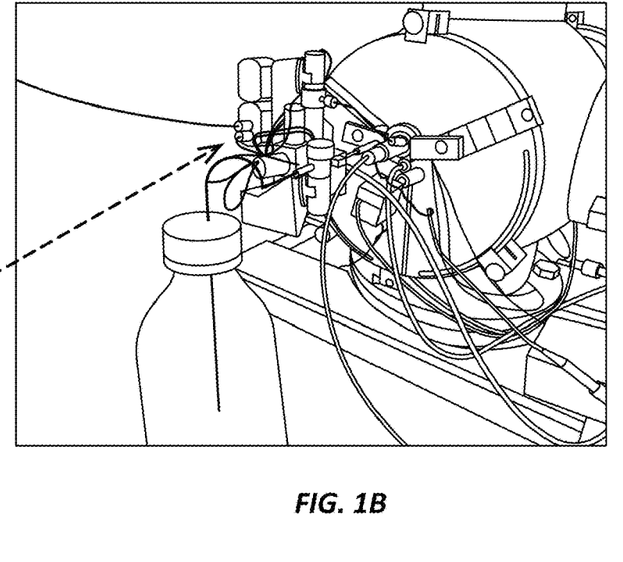
FIG. 1B is a photograph of the low-volatility sampling inlet of FIG. 1A coupled to a vacuum chamber for an MRR spectrometer.

FIGS. 1A and 1B illustrate a metered low-volatility sampling interface 100 for measurements of discrete reaction mixtures (samples) by MRR spectroscopy. FIG. 1A shows a schematic of the sampling interface 100, and FIG. 1B is a photograph of the sampling interface 100 coupled to the vacuum chamber 130 of an MRR spectrometer. In operation, this sampling interface 100 introduces a reaction solution into the MRR spectrometer. It does this by (1) transferring an aliquot of a reaction solution (typically between 50 µL and 500 µL) into a volatilization reservoir; (2) removing the solvent from the reaction solution to concentrate the lower volatility analytes of interest; and (3) volatilizing the analytes and transfers them through a pulsed-jet pinhole nozzle into the MRR spectrometer's vacuum chamber for analysis.

Figure 1C:
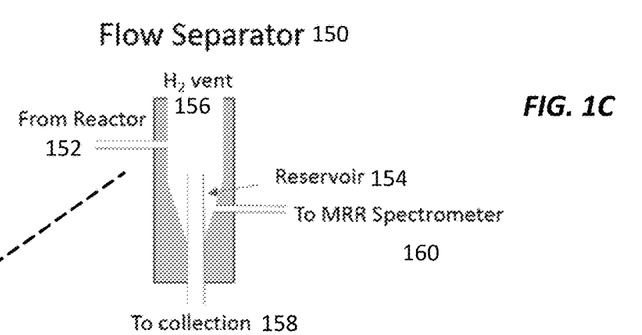
FIG. 1C shows a flow separator that shunts a sample to a low-volatility sampling inlet.
Figure 1D:
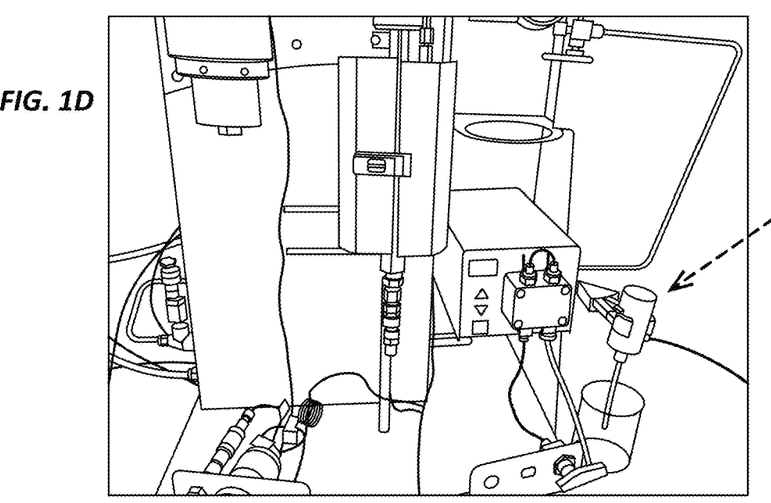
FIG. 1D is a photograph of a flow separator coupled to a commercial flow reactor.

The sampling interface 100 includes a micro-dosing pump 110 that regulates or meters the amount of sample received via an inlet 102 coupled to a flow separator (FIGS. 1C and 1D). The output of the micro-dosing pump 110 is coupled to a carrier gas line 104 via a first valve 112 (e.g., a PTFE-bodied solenoid valve), which is in turn is coupled to a combination volatilization reservoir and pinhole nozzle 120. In the sampling interface 100 shown in FIG. 1A, the volatilization reservoir is machined directly as part of the pinhole nozzle; in other examples, the volatilization reservoir and pinhole nozzle can be separate components. The combination volatilization reservoir and pinhole nozzle 120 has four ports: the inlet from the micro-dosing pump 110, an inlet from the carrier gas line 104 via third valve 106, an outlet via the nozzle to the vacuum chamber 130 for the MRR spectrometer, and an exhaust outlet 124.

In operation, the micro-dosing pump 110 delivers a desired amount (e.g., 10 µL) of liquid sample on each activation cycle. The pump 110 can activate as many times as desired with each measurement cycle (e.g., 5 times to produce a 50 µL sample) to measure out the desired amount of liquid sample. Opening the first valve 112 allows the carrier gas to blow the liquid sample into the reservoir and nozzle 120.

A heater (not) shown heats the sample in the reservoir as described below. First, the heater evaporates the solvent in the sample. The evaporated sample can be vented out of the exhaust port 124 or pulsed into the vacuum chamber by the nozzle. If the evaporated solvent is pulsed into the vacuum chamber, the MRR spectrometer can measure the MRR spectrum of the evaporated solvent. Eventually, the amplitudes of the peaks in the MRR spectrum of the evaporated solvent will fall, indicating that the solvent is substantially evaporated.

Once most of the solvent has boiled off (e.g., after a predetermined time or in response a declining amplitude of a real-time MRR spectroscopy measurement of the volatilized solvent), the heater increases the temperature of reservoir, boiling off any remaining solvent and causing the sample's constituents to volatilize. At the same time, the exhaust valve 124 is closed (if not closed already). The gas inlet valve remains open, and the nozzle 120 pulses the volatilized sample into the vacuum chamber 130 of the MRR spectrometer for analysis, which may take seconds to minutes, depending on the measurement bandwidth. The volatilized sample cools adiabatically as it is pulsed through the nozzle 120. Once the sample has pulsed into the MRR spectrometer vacuum chamber, the second valve 114 and third valve 106 can be actuated so that carrier gas pushes any waste out of the sample tubing via the waste outlet 116 and the exhaust outlet 124 before the next measurement. Once the reservoir has cooled enough, the low-volatility sampling interface 100 can receive the next sample from the flow separator.

FIGS. 1C and 1D show a flow separator 150 suitable for supplying the sample to the low-volatility sampling interface 100 of FIG. 1A. The flow separator 150 is connected in line with a flow reactor as shown in FIG. 1D. More specifically, the flow separator 150 has an inlet 152 that channels a product from the flow reactor into a reservoir 154. (Reaction byproducts and unreacted starting material may also collect in the reservoir 154.) A vent 156 allows hydrogen and other gases to escape the reservoir 154. Most of the product exits the reservoir via a main outlet 158; an auxiliary outlet 160 shunts some of the product to the inlet 102 of the low-volatility sampling interface 100 for MRR spectroscopy.

Low-Volatility Sampling Inlet with an External Volatilization Reservoir

Figure 2:
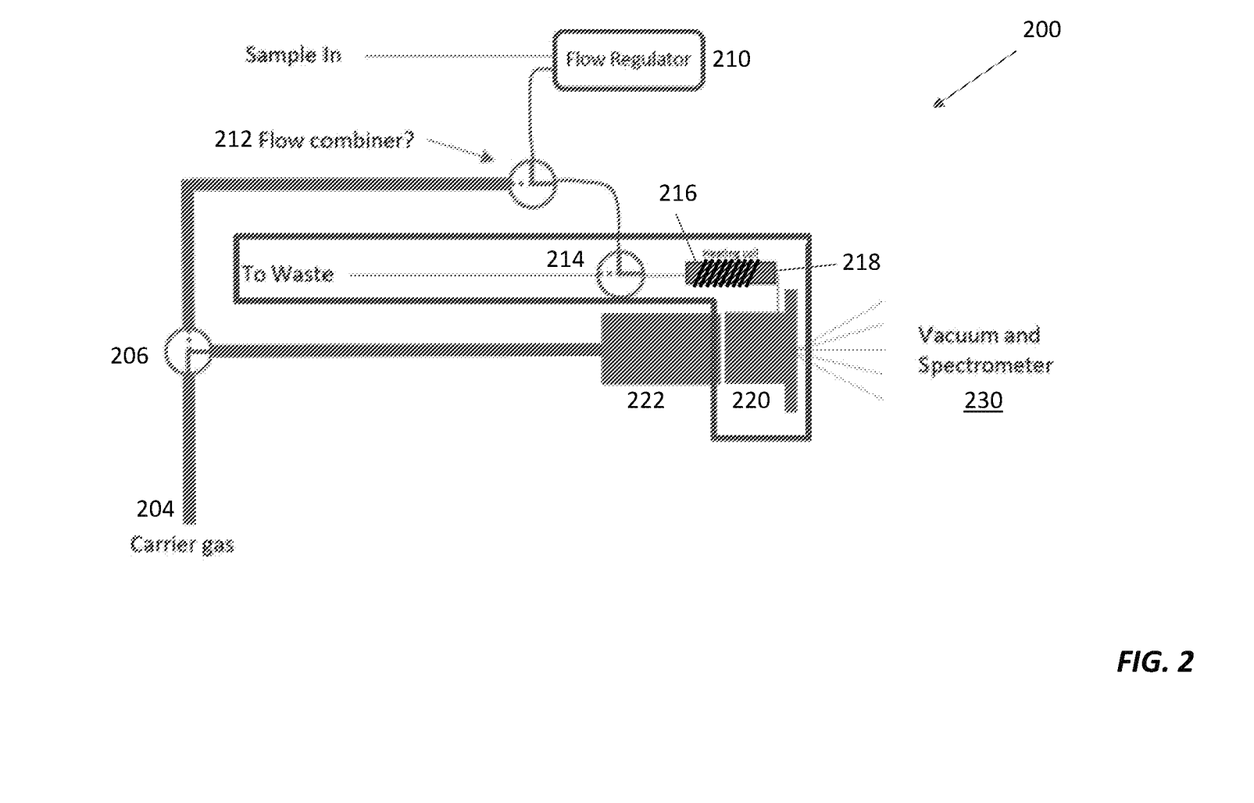
FIG. 2 is a schematic diagram of a low-volatility sampling inlet with an external volatilization reservoir suitable for dosed and continuous-flow measurements. Reaction solutions are deposited in an external sample reservoir that is in thermal contact with a heating block for volatilization. Keeping the low-volatility sampling inlet close to the spectrometer (e.g., within 10 cm) reduces analyte losses, dead volume, and time lag. The sample path after the apparatus can be kept heated.

FIG. 2 shows a low-volatility sampling interface 200 with a volatilization reservoir 216 that is external to a pulsed jet nozzle 220 and a low-volume flow regulator 210 suitable for continuous measurements. The external volatilization reservoir 216 is formed as a small tube packed with a solid material, such as glass wool, to retain the injected solution. The external volatilization reservoir 216 is partially surrounded by a heating coil 218 that can heat the liquid sample in the reservoir at rates of over 2° C./second (e.g., about 5° C./second, 7.5° C./second, 10° C./second, 12° C./second, or 15° C./second), which allows a sample to be volatilized in seconds. The reservoir can be cooled at similar rates (e.g., about 2° C./second, 5° C./second, 7.5° C./second, 10° C./second, 12° C./second, or 15° C./second) using air cooling or a forced coolant for faster cooling.

The input of the external volatilization reservoir 216 is connected via a waste valve 214 and a flow-combiner 212 to the flow regulator 210, which can measure out doses or a continuous stream from a sample source without being purged between measurements. Suitable sample sources include but are not limited to flow separators, flow reactors (tubes conveying reaction solution), batch reactors, flasks, or other sample containers. The output of the external volatilization reservoir 216 is coupled to a heated sample transfer path, made with coated stainless-steel tubing, that prevents the volatilized solvent or analyte from re-condensing before it reaches the MRR spectrometer. The heated sample transfer path may be heated by a separate heating element (not shown) to temperature higher than the reservoir temperature to prevent the volatilized analyte from condensing. An MRR spectrometer with this interface 200 can complete a multi-component reaction analysis with a cycle period of 5-10 minutes, where the cycle period lasts from when one sample is injected to when the next sample can be injected. This is considerably faster than other systems, which take at least 60-90 minutes, including sample preparation time, for isomer analyses.

In operation, the flow regulator 210 either measures a discrete amount of liquid or regulates a continuous stream of liquid sample, which flows towards a flow combiner 212. The flow regulator can be used to adjust and/or maintain the flow rate; typical flow rates may range from 10-100 microliters/minute. Carrier gas enters the flow combiner 212 from a carrier gas inlet 204 and pushes the liquid sample through the waste valve 214 and into the reservoir 216. The heater 218 heats the reservoir 216 and the sample, which volatilizes as described above and below. Another valve 206 diverts some carrier gas through a solenoid valve 222 coupled to the pinhole nozzle 220. Actuating this solenoid valve 222 blows the volatilized sample out of the pinhole nozzle 220 and into the vacuum chamber 230 of the MRR spectrometer. The volatilized sample can be pulsed into the vacuum chamber 230 for discrete or cycled measurement or blown in continuously for continuous measurements.

For discrete or cycled measurements, the waste valve 214 can be actuated once the reservoir 216 been filled with the sample to flush the tubing that connects the flow regulator 210 to the reservoir 216. In addition, the interface 200 can be flushed with solvent between sample measurements, with the MRR spectrometer making optional MRR spectroscopy measurements of the solvent for calibration or reference purposes.

The sampling interface 200 and MRR spectrometer can be controlled using a processor or other electronic controller (not shown). This processor can be connected to the sampling interface's flow regulator 210, heater 218, and valves 206, 212, 214, and 222 and controls the instrument's valves, flows, and temperatures automatically. It can be implemented using a programmable microcontroller development board (such as an Arduino) or a purpose-built external electronics board or as a separate computer (e.g., a laptop).

The external volatilization reservoir 216 improves the sampling interface's performance by making it possible to heat and cool the reservoir faster than a reservoir integrated into the nozzle. A reservoir integrated into the nozzle like the one shown in FIG. 1A can be heated or cooled at a rate of up to about 1° C./second due to the nozzle's mass (e.g., about 20 g) and the inability to completely thermally isolate the reservoir from the solenoid valve and the vacuum chamber. This relatively slow heating and cooling rate adds several minutes per cycle of waiting for the sample in the reservoir to reach the different temperature setpoints. In contrast, an external volatilization reservoir can be more completely thermally isolated from the nozzle, solenoid valve, and vacuum chamber, so it can be heated or cooled much more quickly (e.g., at a rate of 10° C./second to 12° C./second) leading to less waiting per cycle and shorter cycle periods.

Separating the reservoir from the pinhole nozzle also makes it possible to move the heater away from the vacuum chamber of the MRR spectroscopy system, reducing the load on vacuum pump.

An external volatilization reservoir also reduces or eliminates sample-to-sample carryover due to vapors from the reservoir reaching the cooler solenoid valve and poppet. This reduces the likelihood of contamination and increases the fidelity of the spectrometer measurements.

In addition, an external volatilization reservoir is easier to clean than a reservoir integrated into a nozzle. An integrated reservoir is cleaned by bringing the entire vacuum chamber up to atmospheric pressure. The main vacuum pump in the system takes about 1 hour to cool off and 30 minutes to heat, so any reservoir maintenance introduces significant downtime. Conversely, an external reservoir can be cleaned without opening the vacuum chamber, reducing cleaning time by at least 90 minutes. With an external reservoir, the only maintenance that involves opening the vacuum chamber is replacing the PTFE poppet that seals the valve, which wears over time and eventually introduces leaks. This PTFE poppet may be replaced after approximately 100 measurement cycles.

Continuous Sampling with a Low-Volatility Sampling Interface

If the analyte concentration in the solution is high enough, the low-volatility sampling interface 200 of FIG. 2 can run continuously at constant temperature to measure the analyte. In a continuous approach, the sample is continuously volatilized and transferred into the MRR spectrometer. The adjustable continuous flow regulator 210 siphons off a continuous stream of the solution into the external reservoir 216, which volatilizes the entire sample as it flows into the nozzle 220 for injection into the spectrometer vacuum chamber 230. For continuous sampling, the heating coil 218 generally keeps the external reservoir 216 at a temperature above the analyte's boiling point (e.g., about 50° C. above the analyte's boiling point) to promote complete volatilization. In other words, the entire sample is extracted, volatilized, and measured by the MRR spectrometer without any intermediate steps. The continuous and cycled approaches are complementary; the cycled approach may be better for compounds with very high boiling points (e.g., greater than 300° C.), whereas lower boiling-point compounds may be easier to measure using the continuous method. The continuous sampling method may also be useful for samples with solvents and analytes that have similar boiling points.

Figure 3:
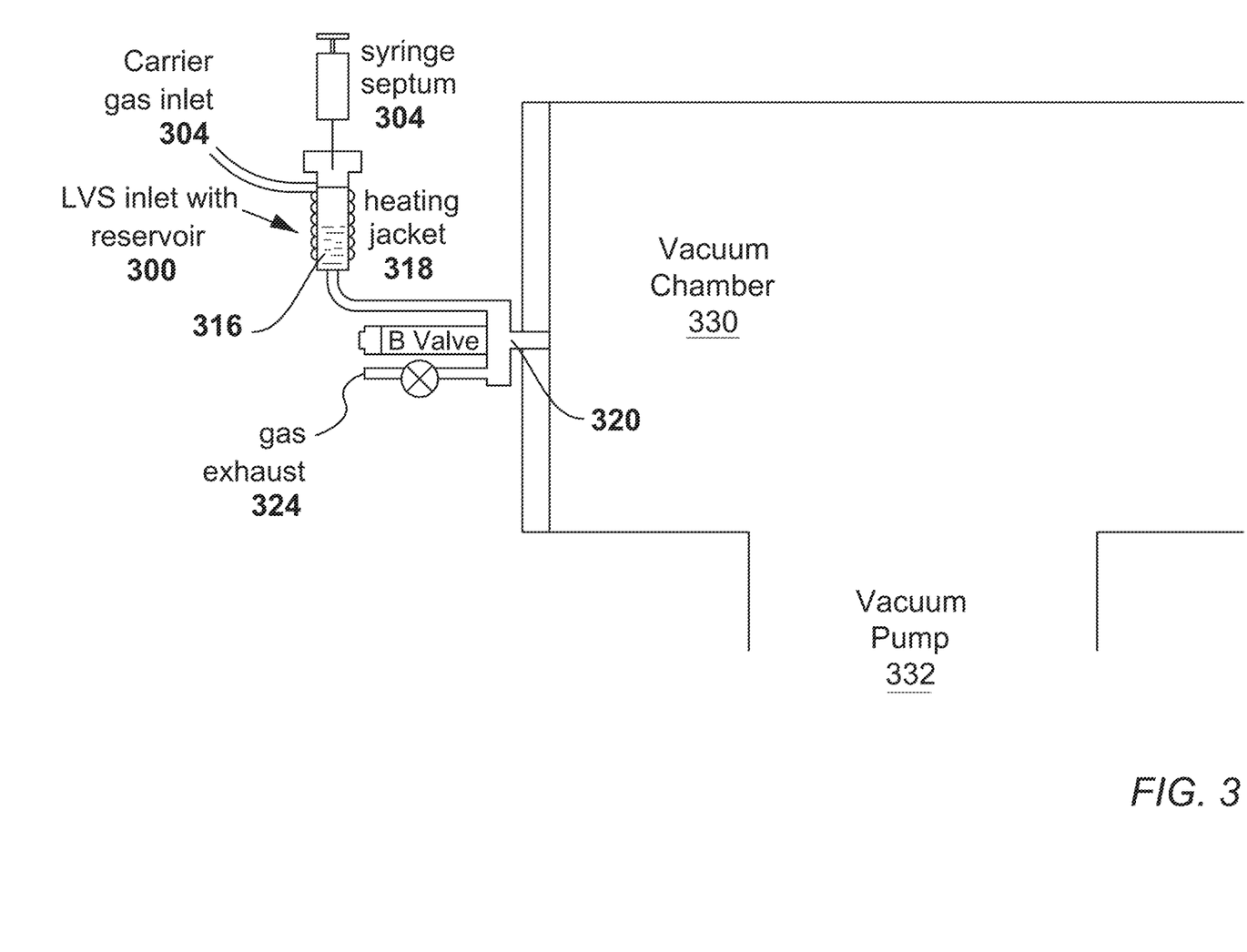
FIG. 3 is a schematic diagram of a low-volatility sampling inlet fed by a syringe septum.

Low-Volatility Sampling Inlet with an External Volatilization Reservoir and Septum FIG. 3 shows a low-volatility sampling interface 300 with a septum 304 for injection via syringe (either delivered manually or via an autosampler). The septum 304 could be at the front of the inlet, for example, in front of the dosing pump (not shown). The septum 304 can be made of any material that can be pierced by a syringe needle and, after the needle is removed, retain vacuum. The septum 304 provides an alternative method to introducing solutions into the system and allows a user to run different analyses on the same instrument if the spectrometer is not directly plumbed into a process line (i.e., if there is no direct connection between the spectrometer and the reaction). This is in contrast to an instrument where an analyst brings the sample to be analyzed manually into the instrument.

Carrier gas flowing through a carrier gas inlet blows the liquid sample collected via the septum 304 into an external reservoir 316. A heating jacket 318 wrapped around the reservoir 316 heats the reservoir 316 and its contents, boiling off the solvent and then the analytes. A valve 322 allows carrier gas to blow the volatilized analyte(s) (and optionally the volatilized solvent) into a vacuum chamber 330, which is pumped down by a vacuum pump 332, for MRR spectroscopy.

Cycled Sampling with a Low-Volatility Sampling Interface

Figure 4:
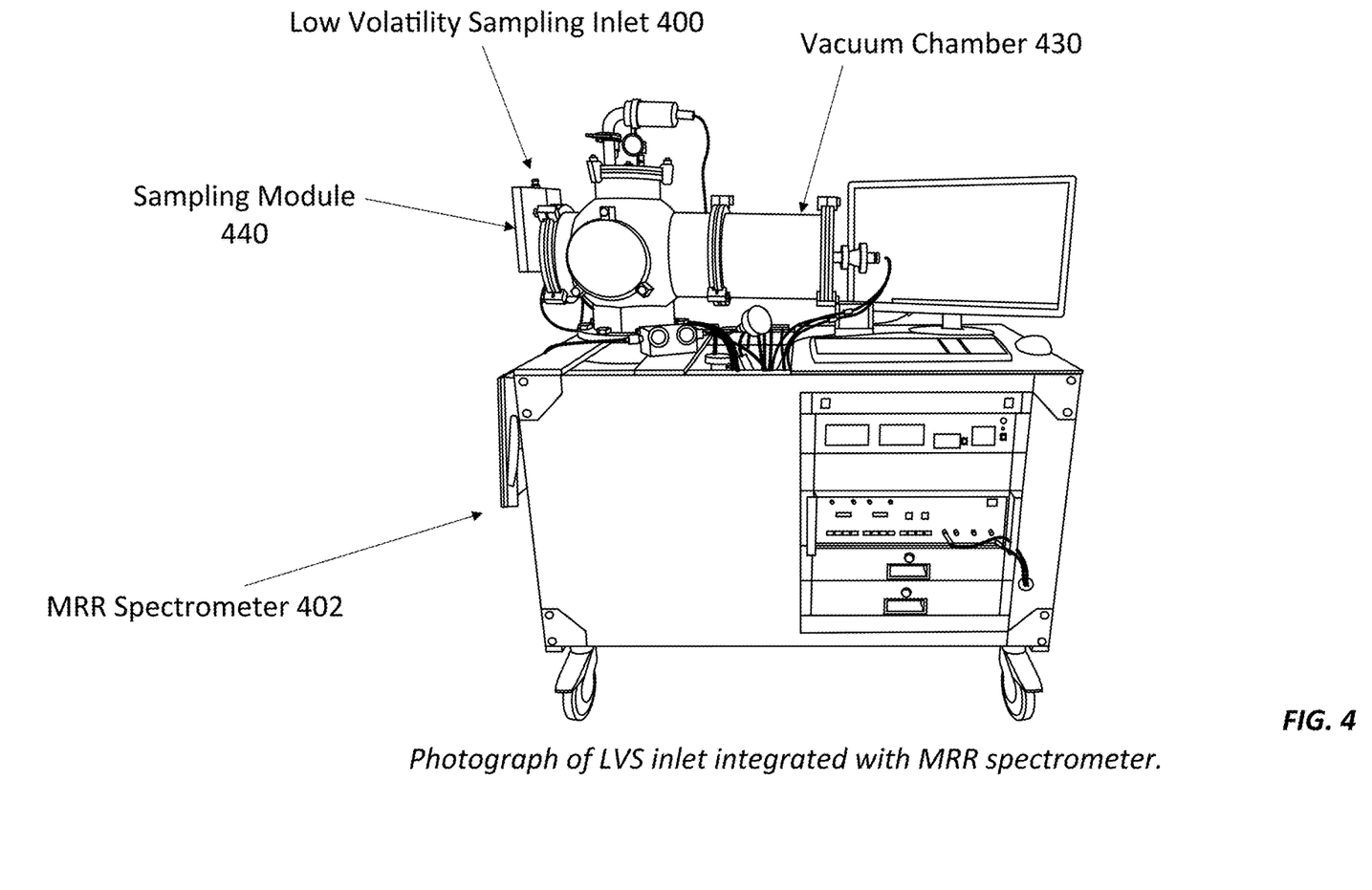
FIG. 4 is a photograph of a low-volatility sampling inlet integrated with an MRR spectrometer.

FIG. 4 is a photograph of a low-volatility sampling inlet 400 integrated with an MRR spectrometer 402. This low-volatility sampling inlet 400 can have a micro-dosing pump, like the low-volatility sampling interface in FIGS. 1A and 1B, for discrete measurements. It could also have flow regulator and/or septum as well as an external volatilization reservoir, as in FIGS. 2 and 3. The low-volatility sampling inlet 400 volatilizes the analyte(s) in a liquid solution from a sampling module 440 and injects them into the MRR spectrometer's vacuum chamber 430 for MRR spectroscopy analysis.

The low-volatility sampling inlet 400 can be enclosed in a housing made of plastic, metal, or any other suitable material. This allows for additional consistency as the internal temperature of the enclosure can be controlled to reduce or eliminate cold spots where solvents can condense and lead to performance issues. If desired, there may be one or more heaters installed in or on the housing to prevent cold spots from forming in the reservoir or sample tubing.

Cycled Sampling with a Low-Volatility Sampling Interface

The low-volatility sampling interfaces shown in FIGS. 1A, 1B, 2, 3, and 4 can be used to measure out a controlled amount, or sample, of a solution from a process flow, vial, or other container, and volatilize the analyte(s) in the sample into either a vacuum or gas flow. This volatilized solution analyte is measured with an MRR spectrometer to determine the product distribution of a continuous flow reaction, e.g., in a pharmaceutical development or production facility.

Figure 5A:
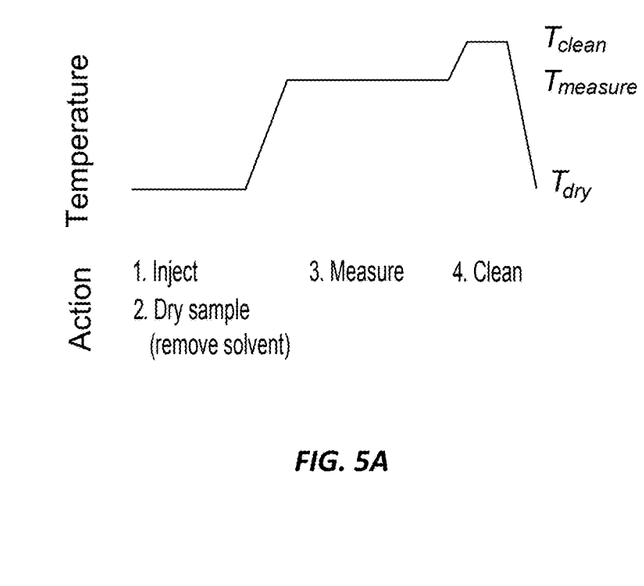
FIG. 5A is a plot illustrating a temperature cycling method for solution measurement using a low-volatility sampling apparatus.

FIG. 5A illustrates a temperature-versus-time profile for a discrete MRR measurement using a low-volatility sampling interface. This discrete MRR measurement may be repeated, e.g., cyclically or periodically. To start the MRR measurement cycle, a precise amount of the liquid sample is metered into the interface's reservoir (either integrated into the nozzle as in FIG. 1A or external as in FIG. 2). If the analytes are high molecular weight (e.g., >200 Da), a pulsed nozzle is used to cool the sample via adiabatic expansion.

In the reservoir, the sample is first heated at a drying temperature ($T_{dry}$ in FIG. 5A; e.g., 5-10° C. below the solvent's boiling point, or about 35-85° C. for organic solvents with boiling points from 40-90° C.) where the solvent has high vapor pressure (near its boiling point), but the analytes have very low vapor pressure. For ethanol as the solvent, this temperature may be 75° C., which is three degrees below ethanol's boiling point. The nozzle is pulsed with carrier gas flowing through the reservoir to blow the volatilized solvent into the MRR spectrometer's measurement chamber. Drying typically lasts about 1-3 minutes.

The MRR spectrometer monitors a spectral line of the solvent. Once the solvent concentration drops, the reservoir temperature is increased to a temperature high enough ($T_{measure}$ in FIG. 5A; e.g., 50-200° C.) to volatilize the analyte(s) of interest. The nozzle pulses the analytes into the MRR spectrometer's measurement chamber, where the analytes are measured. As mentioned above, this pulsing also adiabatically cools the volatilized analytes. After the measurement is complete, which may occur after about 5 minutes and may be indicated by a drop in the MRR signal strength in the band of interest, the reservoir temperature is increased further to a cleaning temperature ($T_{cleaning}$ in FIG. 5A; e.g., 150-250° C.). The reservoir is left at this cleaning temperature, e.g., for about 2 minutes, to purge any remaining analyte from the reservoir. Then the reservoir temperature is cooled to accept the next sample.

The cycled approach shown in FIG. 5A concentrates the sample in the reservoir and therefore improves the MRR measurement sensitivity. It is especially useful for samples with volatile solvents and nonvolatile analytes, e.g., analytes and solvent with a 100° C. or higher difference in their boiling points. Even for samples with low analyte concentrations (e.g., <10 mg/mL, or less than 1% by weight), it yields analyte signals as strong as those for the pure substances. And it is well-suited for determining analyte ratios, where internal standards or other calibration measurements aren't required.

Figure 5B:
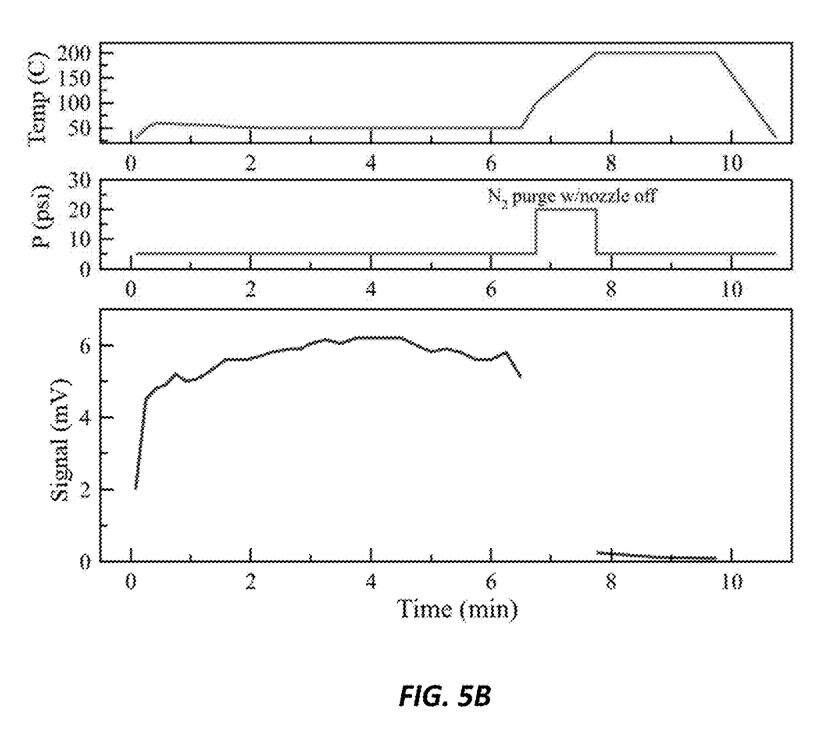
FIG. 5B shows plots of reservoir temperature (top), vacuum pressure (middle), and MRR spectrometer signal (bottom) for an MRR spectroscopy measurement of a 50 µL injection of 10% v/v isopulegol solution in dichloromethane made with a low-volatility sampling inlet.

FIG. 5B illustrates a single ten-minute MRR analysis cycle of a 50 µL sample of 10% v/v isopulegol solution in dichloromethane using a low-volatility sampling interface like those shown FIGS. 1A, 1B, and 3. The top trace shows the reservoir temperature as a function of time. The middle trace shows the pressure in the vacuum chamber over the same period. And the bottom trace shows the amplitude of the MRR signal at single line frequency of the analyte during the measurement. At time 1=0, the liquid sample is injected into the reservoir. Initially, the reservoir is kept at a temperature of 30° C., which is hot enough to evaporate the solvent from the sample. About 30 seconds later, the heater heats the reservoir to a temperature of about 50° C., which is hot enough to volatilize the desired analyte in the sample (isopulegol). The nozzle blows the evaporated sample into the vacuum chamber, producing an MRR signal with an amplitude of about 6 mV.

The MRR signal amplitude remains approximately constant until about 6 minutes have passed, when it starts to fall, indicating that the analyte has been substantially evaporated. In response to this signal drop, the heater temperature increases from 50° C. to 200° C. over about 90 seconds to quickly volatilize the remaining sample in the reservoir. At the same time, nitrogen gas purges the vacuum chamber for about one minute to eliminate any residual solvent. Once the purge is done, the MRR signal of the analyte is revealed to be almost completely gone. The reservoir temperature is then cooled back to 30° C. over the course of about 90 seconds to allow the next sample to be injected.

Figure 6:
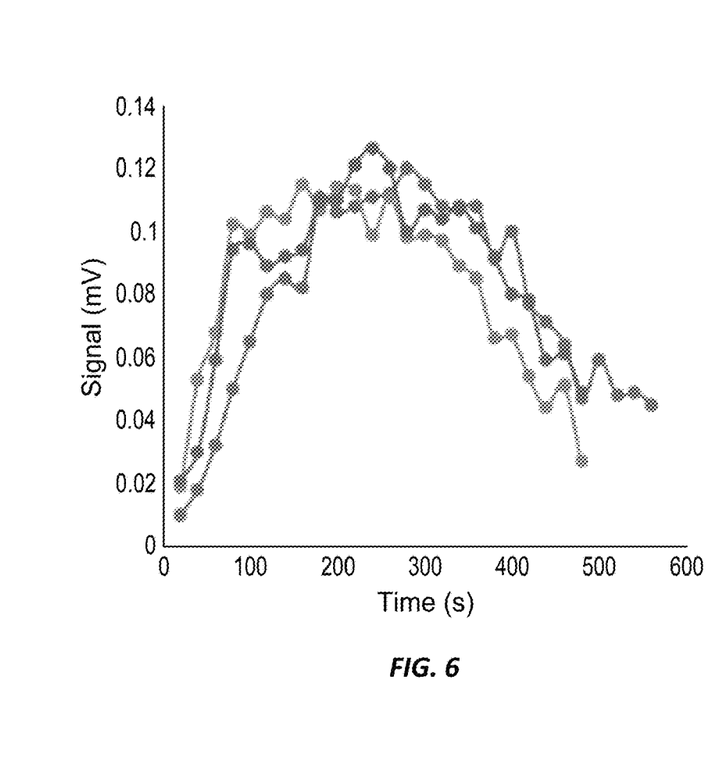
FIG. 6 is a plot of analyte signal versus time for three independent runs with the same sample using the low-volatility sampling inlet and MRR spectrometer of FIG. 1B.

FIG. 6 is a plot of analyte MRR signal versus time for three independent runs with the same sample using the low-volatility sampling interface of FIGS. 1A and 1B. It shows that each measurement cycle is less than 10 minutes, even with the time for ramping the temperature up and down. The signal is not flat with time during a measurement—there is usually a 'grow-in' period, a reasonably stable period, and then a decay period. The amount of analyte can be changed to adjust the duration of the stable period, depending on how much measurement time is desired for a given measurement sensitivity or signal-to-noise ratio. Additionally, it shows that the time for the grow-in period, the stable period, and the decay period are consistent from injection to injection under the same conditions.

Experimental Demonstration of MRR Spectroscopy with Low-Volatility Sampling

Figure 7:
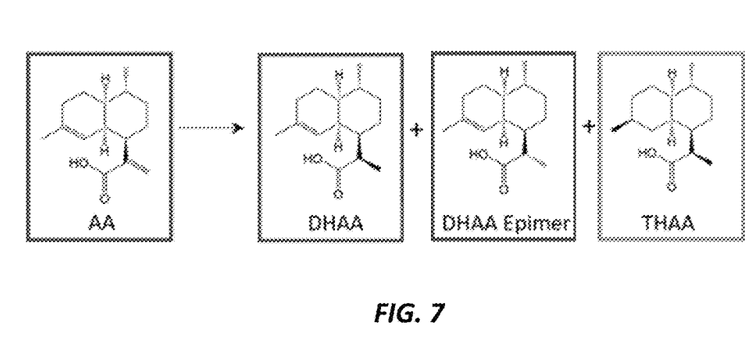
FIG. 7 illustrates hydrogenation of artemisinic acid (AA) to dihydroartemisinic acid (DHAA), which is an intermediate in the synthesis of artemisinin, an important antimalarial drug, and an undesired overreduction byproduct called tetrahydroartemisinic acid (THAA).

FIG. 7 illustrates a continuous catalytic hydrogenation reaction that was monitored using an MRR spectrometer fed by the low-volatility sampling interface of FIGS. 1A and 1B.

For each MRR measurement cycle, the temperature of the volatilization reservoir was first set slightly below the boiling point of the solvent (for ethanol, which has a boiling point of 78° C., the temperature may be about 75° C.) with a heater in thermal communication with the reservoir and vented for 2 minutes. The spectrometer was tuned to an MRR transition of the solvent to monitor its disappearance. Once the solvent was mostly evaporated, the heater increased the reservoir temperature to generate suitable vapor pressure of the analytes of interest. For the hydrogenation of artemisinic acid, this temperature was 160° C. Then the MRRs of each chemical species of interest were measured sequentially for approximately 30 seconds each (depending on the desired sensitivity and the amount of sample loaded) with the MRR spectrometer. After the measurement was complete, the reservoir temperature was increased further by 20° C. to 30° C. with the heater, and the MRR spectrometer monitored the main product resonance to ensure that the main product is removed from the system. Following this, the volatilization reservoir was cooled and prepared to receive the next sample. For the AA hydrogenation, this MRR spectrometer and sampling interface ran with approximately a 15-minute cycle time (of which about 2 minutes is the time spent measuring the MRR spectra).

The goal of the measurements was to monitor the catalytic asymmetric hydrogenation of artemisinic acid (AA) to dihydroartemisinic acid (DHAA). DHAA is an intermediate in the synthesis of artemisinin, an important antimalarial drug. Information obtained from MRR spectroscopy could be used to develop a less expensive process for synthesizing DHAA and hence reduce the cost of synthesizing artemisinin. An inexpensive synthesis of artemisinin would overcome supply limitations arising from the fact that artemisinin is usually isolated from sweet wormwood plants, with varying global supply and widely varying price.

Figure 8A:
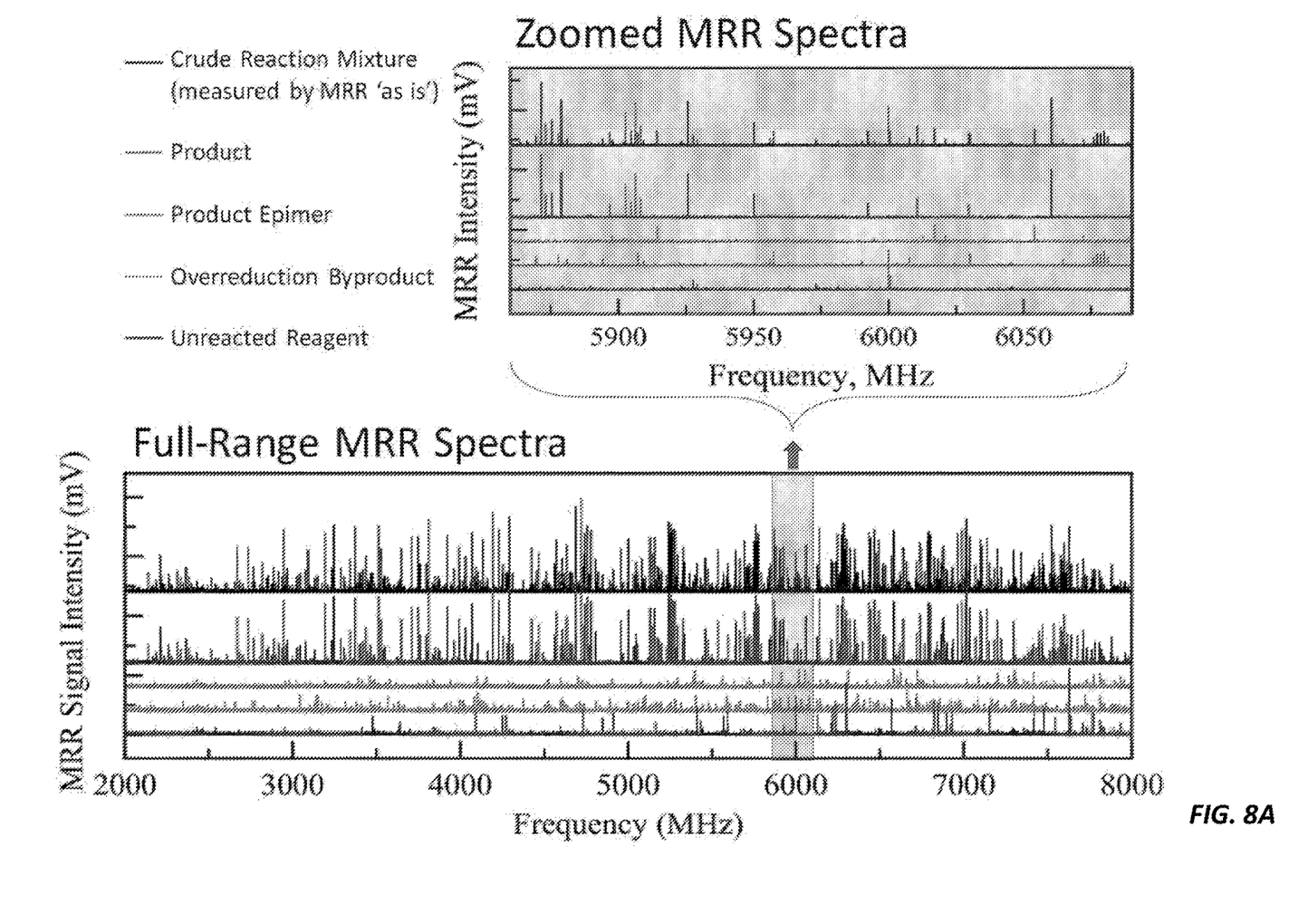
FIG. 8A shows MRR analysis of a crude reaction mixture of the hydrogenation of artemisinic acid (AA) shown in FIG. 7, showing selectivity to all four major components in the mixture (starting material, product, epimer of the product, and overreduction byproduct).

To assess this application, we first measured the broadband spectra to characterize the MRR signatures of the reaction product and all the relevant impurities. The result of this analysis is shown in FIG. 8A. A total of four species were identified—the product (DHAA), starting material (AA), diastereomer of the product (with the hydrogenation producing the undesired stereochemistry), and a byproduct resulting from overreduction called tetrahydroartemisinic acid (THAA). This analysis was performed using about 70 mg of crude reaction product and took approximately 3 hours for measurement. The compounds were identified based on excellent matches between the experimental and computed structural parameters. Because the intensity of each signature is proportional to analyte concentration, this measurement also yields the relative concentrations of the components. Through this one broadband measurement, the resonances of all species in the mixture are determined. These resonances can be added to a spectral library to enable future analyses in a targeted reaction monitoring instrument.

Following this one-time broadband analysis, the resonant frequencies of each of the components in the mixture were monitored with targeted (narrowband) MRR spectroscopy, which is faster and uses smaller sample volumes. For instance, a targeted MRR measurement with 1 mg of sample and a 15-minute cycle time (including sample volatilization and instrument cleaning between samples) can yield a narrowband (e.g., 1 MHz) spectrum with the same sensitivity as the broadband measurement shown in FIG. 8A. At this sensitivity, it is possible to resolve isometric impurities down to a level of about 0.5%. This sensitivity can be achieved using an MRR spectrometer with a Fabry-Perot cavity.

Figure 8B:
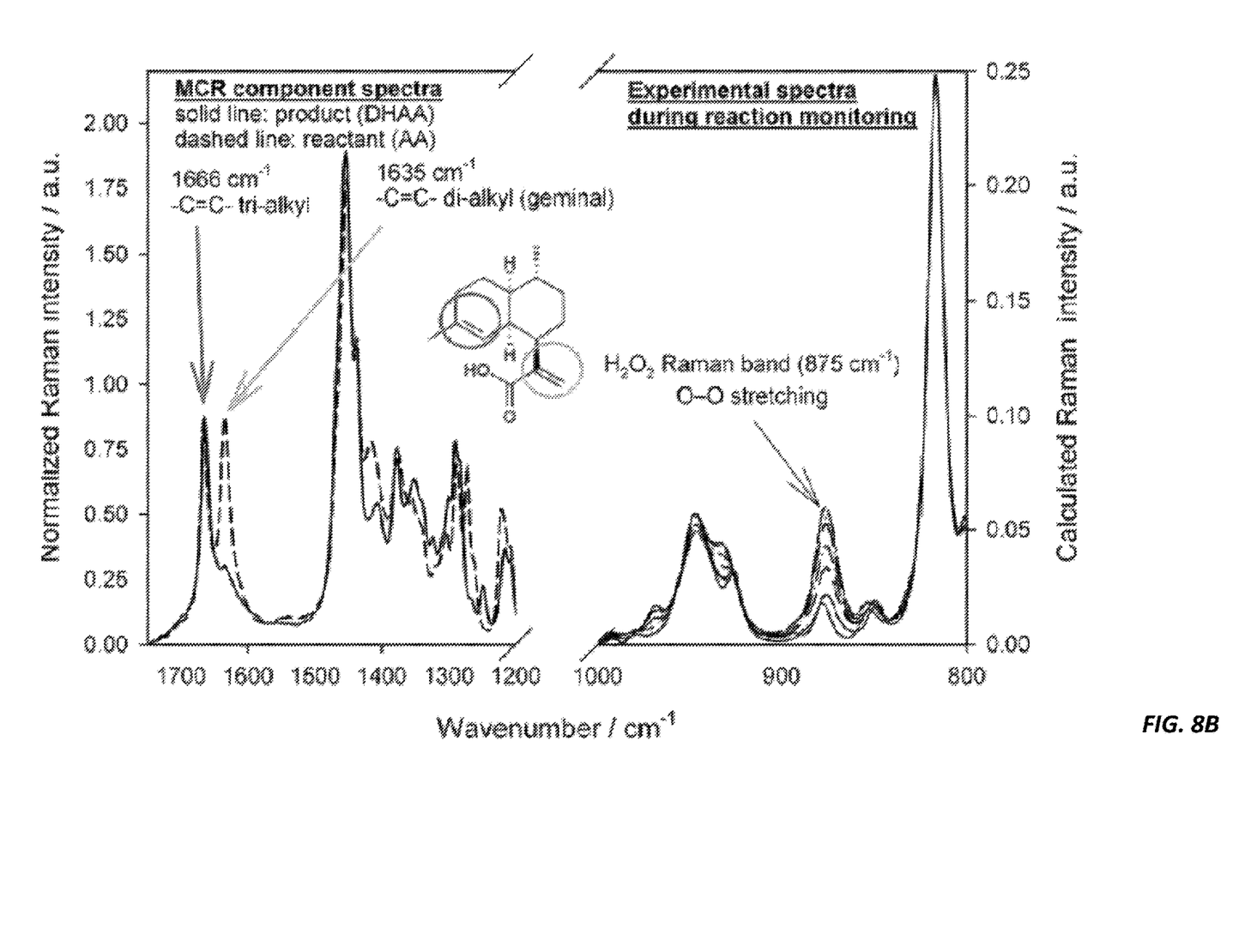
FIG. 8B shows Raman spectra of the crude reaction mixture of FIG. 7. Raman spectroscopy resolves the starting material and product through a two-component chemometrics model. Raman spectroscopy cannot be used to determine the diastereomeric purity or quantify the byproduct.
Figure 9A:
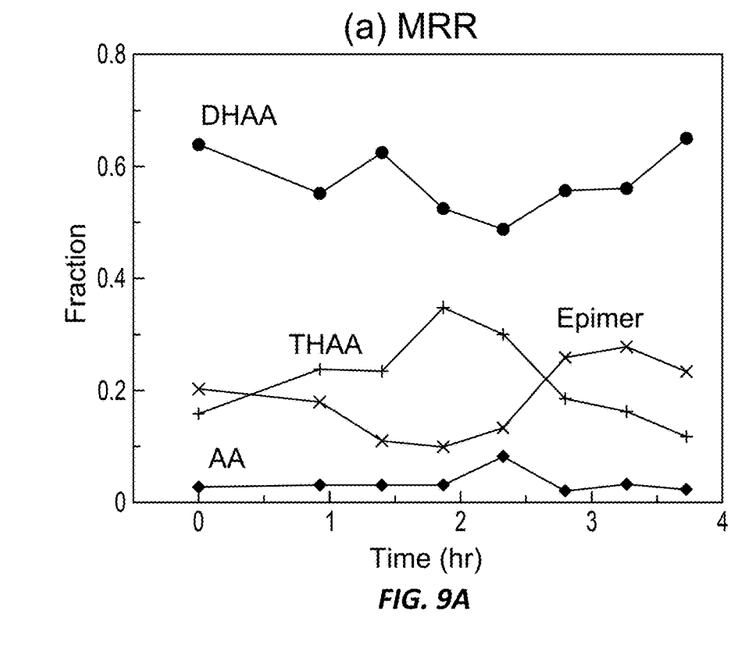
FIGS. 9A and 9B show process monitoring results for the reaction of FIG. 7 from MRR spectroscopy and NMR measurements, respectively. Each MRR result was determined within 15 minutes after the sample was extracted, while the NMR results took 4 hours to return. Additionally, the NMR measurement could not directly quantify the overreduction product (THAA).
Figure 9B:
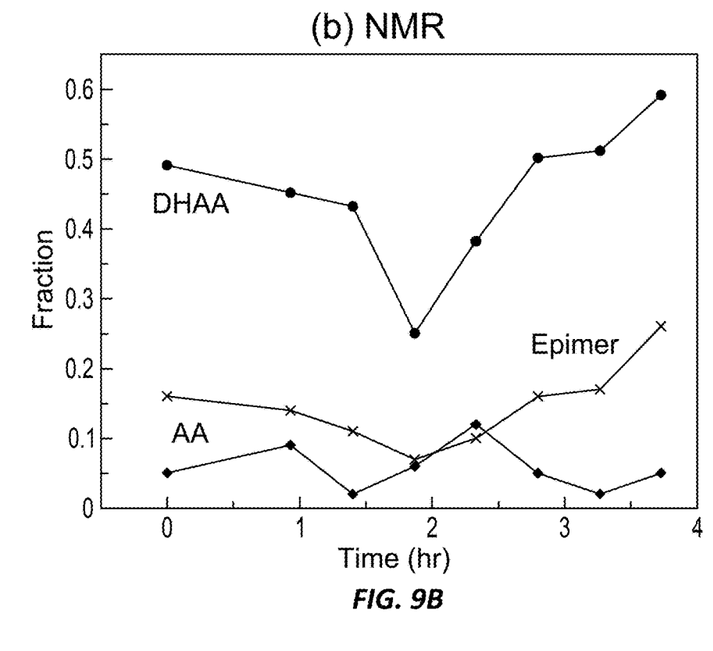

In contrast, the process Raman spectroscopy measurement shown in FIG. 8B can resolve the starting material and product from a chemometric model but does not yield any information about the diastereomer ratio or the unwanted byproduct, THAA. Determining the diastereomer ratio with an offline nuclear magnetic resonance (NMR) measurement as shown in FIG. 9B took four hours including sample workup compared to 15 minutes for a corresponding MRR measurement shown in FIG. 9A; however, even offline NMR instrumentation cannot accurately quantitate the THAA byproduct due to its structure

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of analyzing a mixture of analytes in a solution, the method comprising:
    extracting a sample of the solution, the sample containing the mixture of analytes dissolved in a solvent;
    transferring the sample into a reservoir;
    heating the reservoir to a first temperature to volatilize the solvent;
    injecting the solvent into a vacuum chamber of a molecular rotational resonance (MRR) spectrometer via a nozzle;
    measuring an MRR spectrum of the solvent with the MRR spectrometer;
    heating the reservoir from the first temperature to a second temperature higher than the first temperature to volatilize the analytes in the mixture of analytes;
    while heating the reservoir from the first temperature to the second temperature, injecting pulses of the sample into the vacuum chamber via the nozzle, the pulses of the sample including the analytes;
    sequentially measuring MRR spectra of the analytes with the MRR spectrometer; and
    identifying the analytes based on the MRR spectra of the analytes.

2. The method of claim 1, wherein at least one of the analytes has a molecular weight of at least 100 atomic mass units.

3. The method of claim 1, wherein heating the reservoir to the second temperature comprises heating the reservoir at a rate of at least about 2° C./second.

4. The method of claim 1, wherein injecting the pulses into the vacuum chamber comprises adiabatically cooling the analytes.

5. The method of claim 1, wherein identifying the analytes based on the MRR spectra comprises identifying at least one isomer of at least one analyte based on at least one of the MRR spectra.

6. The method of claim 1, further comprising:
    determining that the solvent has evaporated from the sample based on an amplitude of the MRR spectrum of the solvent.

7. The method of claim 6, wherein injecting the pulses into the vacuum chamber occurs in response to determining that the solvent has evaporated from the sample based on the amplitude of the MRR spectrum of the solvent.

8. The method of claim 1, further comprising:
    heating the reservoir to a third temperature higher than the second temperature in response to a decrease in signal strength of the MRR spectra of the pulses of the sample.

9. The method of claim 1, further comprising:
    calibrating the MRR spectrometer based on the MRR spectrum of the solvent.

10. The method of claim 1, further comprising:
    after injecting the pulses of the sample into the vacuum chamber via the nozzle, cooling the reservoir at a rate of at least 1° C./second.

11. A method of analyzing a mixture of analytes in a liquid solution, the method comprising:
    siphoning, with a continuous flow regulator, a continuous stream of the liquid solution into a reservoir heated to a temperature above a boiling point of the mixture of analytes;
    continuously volatilizing the mixture of analytes in the reservoir;
    transferring the mixture of analytes from the reservoir to a vacuum chamber;
    measuring a molecular rotational resonance (MRR) spectrum of the mixture of analytes in the vacuum chamber; and
    identifying at least one component of the mixture of analytes based on the MRR spectrum.

12. The method of claim 11, wherein siphoning the continuous stream of the liquid solution comprises setting a flow rate of the liquid solution to about 10 microliters/minute to about 100 microliters/minute.

13. The method of claim 11, wherein the mixture of analytes comprises at least one analyte having a molecular weight of at least 100 atomic mass units.

14. The method of claim 11, wherein the mixture of analytes comprises a plurality of isomers and identifying the at least one component of the mixture of analytes comprises identifying at least one isomer in the plurality of isomers.

15. The method of claim 11, wherein transferring the mixture of analytes to the vacuum chamber comprises blowing the mixture of analytes into the vacuum chamber with a carrier gas.

\* \* \* \* \*